United States Patent

Naka

[11] Patent Number: 6,089,764
[45] Date of Patent: Jul. 18, 2000

[54] CARTRIDGE LOADING DEVICE

[75] Inventor: Haruyuki Naka, Wakayama, Japan

[73] Assignee: Noritsu Koki Co., Ltd., Wakayama, Japan

[21] Appl. No.: 09/084,090

[22] Filed: May 26, 1998

[30] Foreign Application Priority Data

May 23, 1997 [JP] Japan ..................................... 9-133519

[51] Int. Cl.⁷ .................................................. G03D 13/08
[52] U.S. Cl. .......................................... 396/647; 396/599
[58] Field of Search .................................... 396/647, 538, 396/598, 599

[56] References Cited

U.S. PATENT DOCUMENTS

| 5,105,211 | 4/1992 | Kameyama | 354/173.1 |
| 5,546,150 | 8/1996 | Wada et al. | 354/288 |
| 5,621,493 | 4/1997 | Wada et al. | 396/538 |
| 5,842,077 | 11/1998 | Zangenfeind et al. | 396/647 |

FOREIGN PATENT DOCUMENTS 7-295073  11/1995  Japan .

*Primary Examiner*—D. Rutledge
*Attorney, Agent, or Firm*—Smith Patent Office

[57] ABSTRACT

A cartridge loading device comprising a cartridge holder having a holding portion for holding a cartridge having a photographic film therein. The cartridge loading device also includes a holder supporting member for supporting the cartridge holder. The cartridge holder is movable between a loading position where the cartridge can be loaded onto the holding portion and a non-loading position where the cartridge is not able to be loaded onto the holding portion. The holder supporting member is movable between a first position where a photographic film withdraw opening portion of the cartridge and a transfer path do not coincide and a second position where the photographic film withdraw opening portion and a transfer path do coincide when the holder supporting member supports the cartridge holder in the non-loading position. The holder supporting member is capable of moving from the first position to the second position based on movement of the cartridge holder from the loading position to the non-loading position.

16 Claims, 14 Drawing Sheets

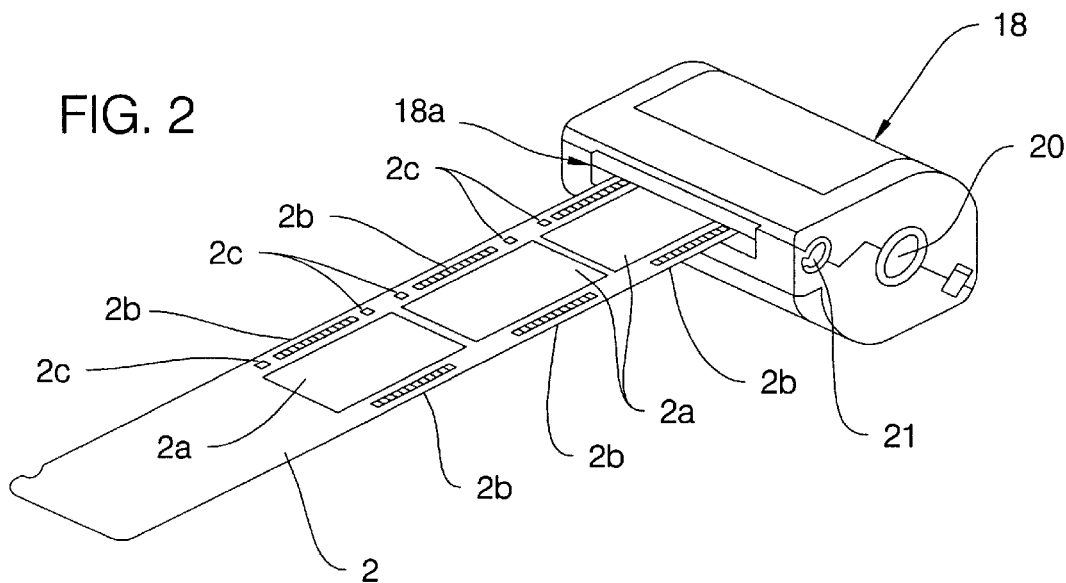
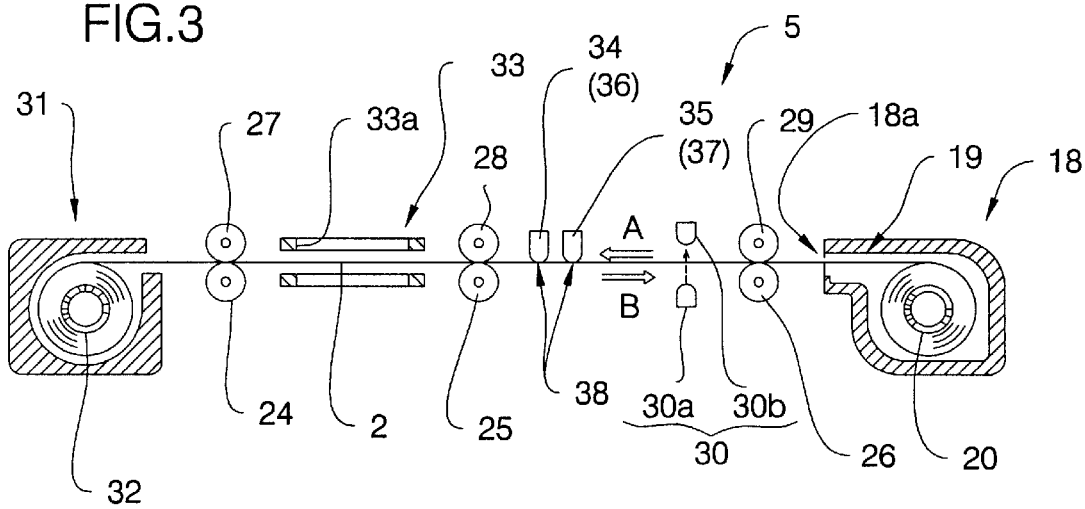

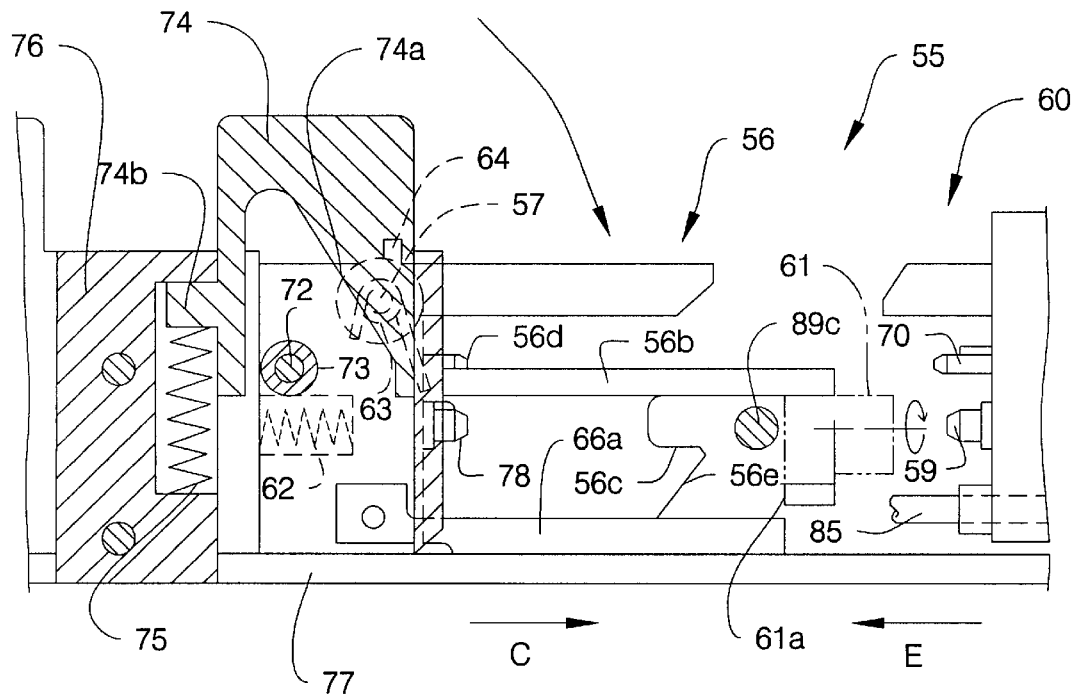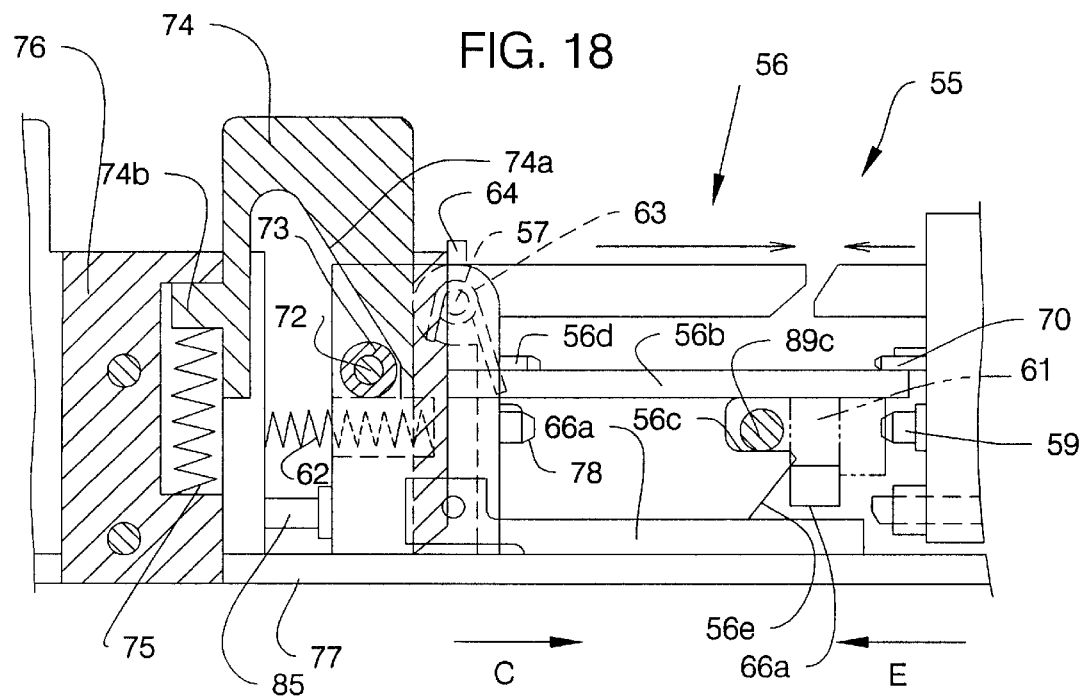

CARTRIDGE LOADING DEVICE

BACKGROUND OF THE INVENTION

1. Field of the Invention

The present invention relates to a photographic film cartridge loading device. More specifically, the present invention relates to a cartridge loading device which is used in a photographic film transfer unit of a photographic printing apparatus.

2. Discussion of the Related Art

A cartridge loading device is shown and described in Japanese Laid Open Patent No. 7-295073. This device comprises a cartridge holder having an opening for loading a cartridge and another opening for removing the loaded cartridge from the cartridge holder. There is also provided an engaging member for engaging the cartridge at the side of the opening. Further, when a second cartridge is loaded from the opening for loading into the cartridge holder and a first cartridge is disposed therein, engagement between the first cartridge and the engaging member is released and the first cartridge is pushed out by the loading operation of the second cartridge. Then the second cartridge is engaged by the engaging member.

The above mentioned cartridge loading device is adapted for a camera. However, since there is the engaging member and the parts related to the engaging member disposed in the cartridge holder, there are a lot of parts in the device and that is a problem.

Further, it is necessary to cancel interference between the cartridge and a supporting axis engaged with a spool of the cartridge during the loading process of the cartridge. Furthermore, there is a complicated mechanism which is a lock and unlock mechanism for the cartridge that includes a release lever for releasing the supporting axis and the other levers related to the releasing operation.

SUMMARY OF THE INVENTION

It is an object of the present invention to provide a cartridge loading device having a simple structure compared with the above mentioned prior art.

In order to achieve the above mentioned object, the present invention provides a cartridge loading device, which comprises a cartridge holder having a holding portion for holding a cartridge having a photographic film therein. The cartridge loading device also includes a holder supporting member for supporting the cartridge holder. The cartridge holder is movable between a loading position where the cartridge can be loaded onto the holding portion and a non-loading position where the cartridge is not able to be loaded onto the holding portion. The holder supporting member is movable between a first position where a photographic film withdraw opening portion of the cartridge and a transfer path do not coincide and a second position where the photographic film withdraw opening portion and a transfer path do coincide when the holder supporting member supports the cartridge holder in the non-loading position. The holder supporting member is capable of moving from the first position to the second position based on movement of the cartridge holder from the loading position to the non-loading position.

According to the above cartridge loading device, the operation method for loading the cartridge is carried out by inserting the cartridge into the cartridge holder when it is disposed in the loading position, then the cartridge holder is moved from the loading position to the non-loading position. Further, the holder supporting member is moved from the first position to the second position corresponding to the above mentioned movement of the cartridge holder from the loading to the non-loading positions.

The second position allows a predetermined treatment of a photographic film to be carried out such as printing an exposure after the photographic film has been withdrawn from the cartridge.

It is preferred that the start timing of the movement of the holder supporting member is the point of completion of the cartridge holder movement to the non-loading position or just before the point of completion of the cartridge holder movement. A supporting axis inserted into a spool of the cartridge is carried out by movement of the holder supporting member from the first position to the second position. Accordingly, the supporting axis does not cause any interference as the cartridge holder moves from the loading to the non-loading positions.

Thus, the cartridge loading device of the present invention is only required to insert the cartridge into the cartridge holder. In other words, in case of the present invention, the cartridge loading device is able to have a simple structure since it is not necessary to have any engaging mechanism against cartridge or move the supporting axis corresponding to the loading operation of the cartridge.

It is a second object of the present invention to provide a cartridge loading device with a simple operation for loading the cartridge.

In order to achieve the above mentioned second object, the present invention provides a cartridge loading device which has a supporting member bias means biasing the holder supporting member in a direction from the first position to the second position and a stopper obstructing the movement of the holder supporting member from the first position to the second position. The stopper is released as the cartridge holder is moved from the loading to the non-loading position.

According to the above structure, the stopper which obstructs the movement of the holder supporting member is released by movement of the cartridge holder to the non-loading position and the holder supporting member is then moved from the first position to the second position by the bias of the supporting member bias means. Further, since the supporting axis is inserted into the cartridge and the withdraw opening of the photographic film of the cartridge coincides with the transfer path, the photographic film can be withdrawn from the cartridge.

It is a third object of the present invention to provide a cartridge loading device having an improved cartridge loading operation.

In order to achieve the above mentioned third object, the present invention provides a cartridge loading device which has the holder supporting member moved from the second position to the first position prior to releasing the stopper.

Since the stopper obstructs movement of the holder supporting member from the first position to the second position, the stopper contacts with the holder supporting member when the stopper is in the obstruction condition. Accordingly, when the stopper is released, the stopper has to be moved by overcoming friction effecting a contacting portion. Thus, it is required that the power to release the stopper becomes large, if the friction is relatively large. Therefore, since the holder supporting member is moved from the second position to the first position forcibly by a third structure, the effect of friction can be reduced during the releasing operation of the stopper.

It is a fourth object of the present invention to provide a cartridge loading device having no exclusive member for carrying out movement of the holder supporting member prior to release of the stopper. Therefore, the loading device of the present invention can reduce the cost of the cartridge loading mechanism.

In order to achieve the above mentioned fourth object, the present invention provides a cartridge loading device which has a cam mechanism comprising the cartridge holder and the holder supporting member to carry out movement of the holder supporting member prior to release of the stopper.

It is a fifth object of the present invention to provide a cartridge loading device having no exclusive member for releasing the stopper. Therefore, the loading device of the present invention can reduce the cost of the cartridge loading mechanism.

In order to achieve the above mentioned fifth object, the present invention provides a cartridge loading device having one part of the cartridge holder which directly carries out release of the stopper.

It is a sixth object of the present invention to provide a cartridge loading device capable of carrying out a simple loading and unloading operation of the cartridge.

In order to achieve the above mentioned sixth object, the present invention provides a cartridge loading device which has a holder bias means for biasing the cartridge holder a direction from the non-loading position to the loading position and an obstruction member for obstructing the movement of the cartridge holder toward the loading position when the holder supporting member is positioned at the second position.

Accordingly, when the cartridge is loaded, the cartridge is loaded into the cartridge holder positioned at the loading position and the cartridge holder is moved from the loading position to the non-loading position while overcoming the bias force of the holder bias means. Then, the cartridge holder is moved from the first position to the second position corresponding to the movement of the cartridge holder toward the non-loading position and as a result, movement of the cartridge holder toward the loading position is obstructed by the obstruction member. Further, when the cartridge is removed from the cartridge holder, the obstructed condition caused by the obstruction member is released and the cartridge holder is moved to the loading position by the bias force of the holder bias means.

It is a seventh object of the present invention to provide a cartridge loading device having a cartridge holder being able to stabilize at a specified loading position. In other words, it is a seventh object of the present invention to provide a cartridge loading device having a cartridge holder that can be stabilized at several loading positions which are decided by the operator loading the cartridge.

In order to achieve the above mentioned seventh object, the present invention provides a cartridge loading device which has the cartridge holder rotationally supported on a predetermined axis on the holder supporting member and a rotation restriction member for restricting a rotational position of the cartridge holder in the loading position. Further, it is preferred that the rotation restriction member is able to adjust the rotational restriction position.

Accordingly, even when the cartridge holder is biased from the non-loading position toward the loading position by the holder bias means, the cartridge holder can be stabilized by the rotation restriction member at the specified loading position.

It is an eighth object of the present invention to provide a cartridge loading device having the holder supporting member with only a few movements from the first position to the second position to simplify the cartridge loading mechanism.

In order to achieve the above mentioned eighth object, the present invention provides a cartridge loading device which has a spooling driving axis supporting one end portion of a spool formed in the cartridge, a supporting axis supporting member for supporting a spool supporting axis and the supporting axis supporting member is moved in a direction for supporting the spool by the spool supporting axis corresponding to the movement of the cartridge supporting member from the first position to the second position. Accordingly, since it is not only the supporting axis supporting member moving but also the spool driving axis moving, the movement amount of the holder supporting member from the first to the second positions can be reduced. In detail, the present invention provides a first rack gear integrally formed to the holder supporting member, a second rack gear integrally formed to the supporting axis supporting member and a pinion gear engaged with the first and second rack gears. Accordingly, since a power source is connected to the holder supporting member or the supporting axis supporting member, it is not necessary to have the power source to each of these supporting members, respectively.

It is a ninth object of the present invention to provide a cartridge loading device having a return member for directly moving the holder supporting member. In other words, since the holder supporting member is directly moved by the return member, the structure for moving the holder supporting member can be simplified. Further, this arrangement allows a superior operational ability for moving the holder supporting member since the movement of the holder supporting member is only operated by the return member.

In order to achieve the above mentioned ninth object, the present invention provides a cartridge loading device which has the return member for returning the holder supporting member from the second position to the first position. Accordingly, the holder supporting member is moved from the second position to the first position by operation of the return member and then the cartridge holder is moved to the loading position for loading or unloading the cartridge.

It is a tenth object of the present invention to provide a cartridge loading device having an opening portion in the cartridge holder for confirming whether a cartridge is loaded into the cartridge holder from outside of the cartridge holder.

In order to achieve the above mentioned tenth object, the present invention provides a cartridge loading device which has the open portion in the cartridge holder. Accordingly, even when the photographic film jams in the film transfer unit, it is easy to remove the jammed film from the cartridge.

BRIEF DESCRIPTION OF THE DRAWINGS

The above objects and features of the present invention will be apparent to those skilled in the art from the following description of the preferred embodiments thereof when considered in conjunction with the appended drawings in which:

FIG. 2 is a perspective view showing a photographic film withdrawn from a film cartridge in accordance with an embodiment of the present invention;

FIG. 3 is a cross sectional view showing a film transfer unit in accordance with an embodiment of the present invention;

FIG. 17 is a second side view of the cartridge loading portion for explaining the operation of loading a cartridge in accordance with an embodiment of the present invention;

FIG. 18 is a third side view of the cartridge loading portion for explaining the operation of loading a cartridge in accordance with an embodiment of the present invention;

DETAILED DESCRIPTION OF THE PREFERRED EMBODIMENTS

Figure 1:
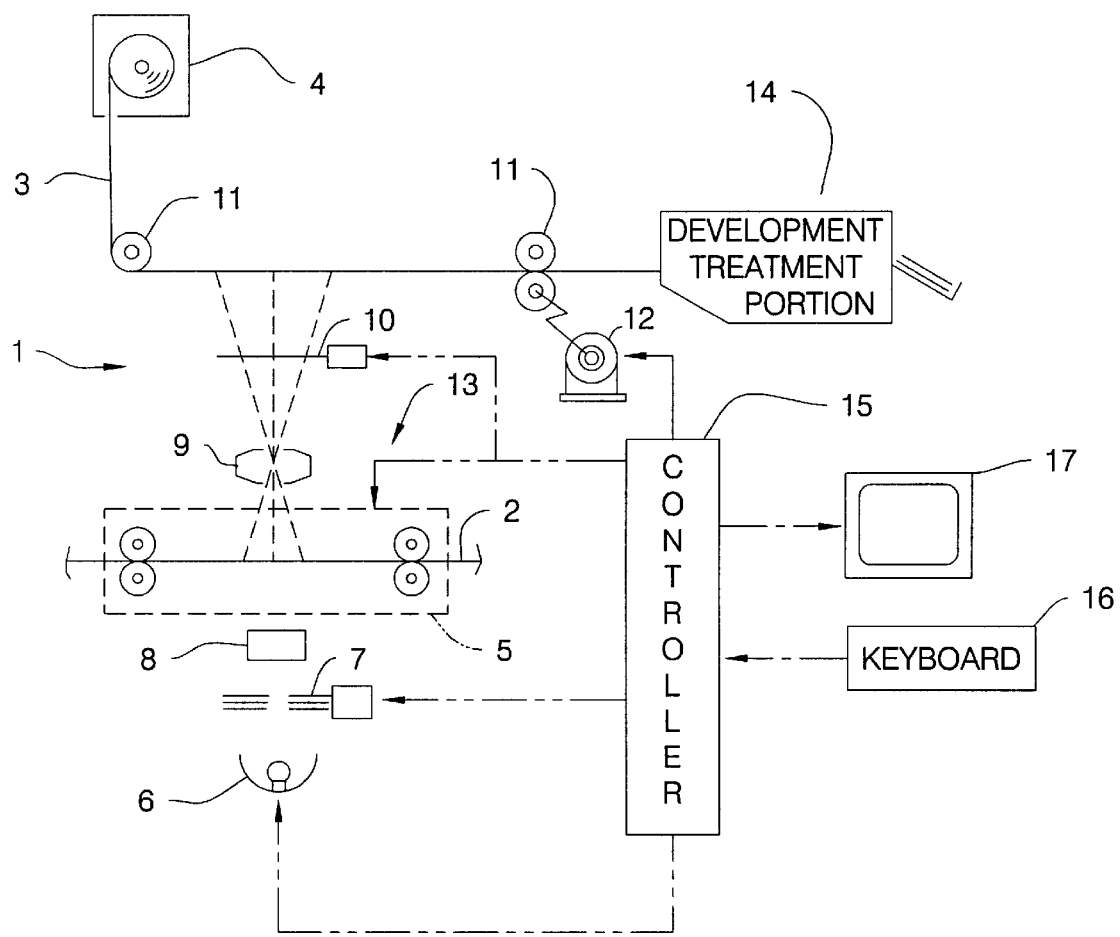
FIG. 1 is a diagrammatic view of a photographic printing apparatus in accordance with the present invention.

As shown in FIG. 1, a photographic printing apparatus 1 includes an exposure portion 13 for projecting and exposing picture information on a photographic film 2 onto a photographic printing paper 3, a development treatment portion 14 for developing the exposed printing paper 3, and a controller 15 for controlling the exposure portion 13 and the development treatment portion 14.

The controller 15 is connected to a keyboard 16 for inputting a plurality of control commands and a monitor 17 for displaying picture information which is read by a scanner portion (not shown).

After the photographic film 2 is inserted into the exposure portion 13, the picture information on the film 2 is read from each picture frame on the film 2 and is transferred to the controller 15. The controller 15 decides the exposure amount of each picture frame based on the picture information that is read from the film 2. Then, the monitor 17 displays the image which is simulated based on the determined exposure amount and this should be the same picture as the picture exposed on the printing paper 3.

An operator of the photographic printing apparatus 1 is able to input modified exposure and printing commands from the keyboard 16 when the monitor does not display a proper image. The controller 15 decides the final exposure condition with an amended exposure condition based on the modified command.

The controller 15 controls the operation of each portion of the exposure portion 13 based on the decided exposure condition and then the picture information on the film 2 is projected and exposed on the printing paper 3 withdrawn from a printing paper magazine 4.

After the printing paper 3 is finished being exposed, it is transferred to the development treatment portion 14. There it is treated with development fluid, cut into pieces corresponding to each picture frame of the film 2 and then ejected.

The exposure portion 13 has a film transfer unit 5 for transferring and positioning the film 2; a light source 6 for exposing the film; an optical filter 7 comprising yellow, magenta, and cyan filters going in and out of the exposure light path and adjusting the color balance of irradiation light from the exposure light source 6; a mirror tunnel 8 for equally mixing the color balanced light by the optical filter 7; a lens 9 for focusing and printing the picture information on the film 2 onto the printing paper 3; a shutter 10; a transfer roller 11 for transferring the printing paper 3; and a motor 12 for driving the transfer roller 11.

The optical filter 7 and the shutter 10 are controlled by the controller 15. Each filter position of the optical filter 7 and the release time of the shutter 10, the so-called exposure time, are controlled by the exposure condition decided by the controller 15.

Further, the motor 12 transfers the printing paper 3 frame by frame based on the control of the controller 15.

The development treatment portion 14 has a plurality of treatment tanks (not shown) filled with a plurality of treatment liquids for developing the exposed printing paper 3 and a cutter (not shown) for cutting the exposed printing paper 3 into pieces.

As shown in FIG. 2, the film 2 is used in the system, the so-called advanced photographic system, and comprises a picture area 2a for printing an image on a frame therein, a magnetic track (magnetic recording surface) 2b disposed on an upper and lower portion of the picture area 2a, and perforations 2c.

The film 2 is usually stored in the cartridge 18 and the film withdraw portion 18a is shaded by a light door 19 as shown in FIG. 3. After the light door 19 is opened by inserting a driving axis to a light door open and close hole 21, the film 2 is withdrawn by driving a spool 20.

FIG. 3 is a cross sectional view as well as a schematic view of the film transfer unit 5. Driving rollers 24, 25 and 26 and press rollers 27, 28 and 29 are disposed along a transfer path. A winding portion 31 is disposed at the end portion of the transfer path and winds the film 2 withdrawn from the cartridge 18 to a winding spool portion 32. An optical sensor 30 comprises a light supplying portion 30a and a light receiving portion 30b that detects optical data on the film 2. A negative mask 33 has an opening 33a defining a printing area of the picture area 2a of the film 2 for printing onto the printing paper 3.

Figure 4:
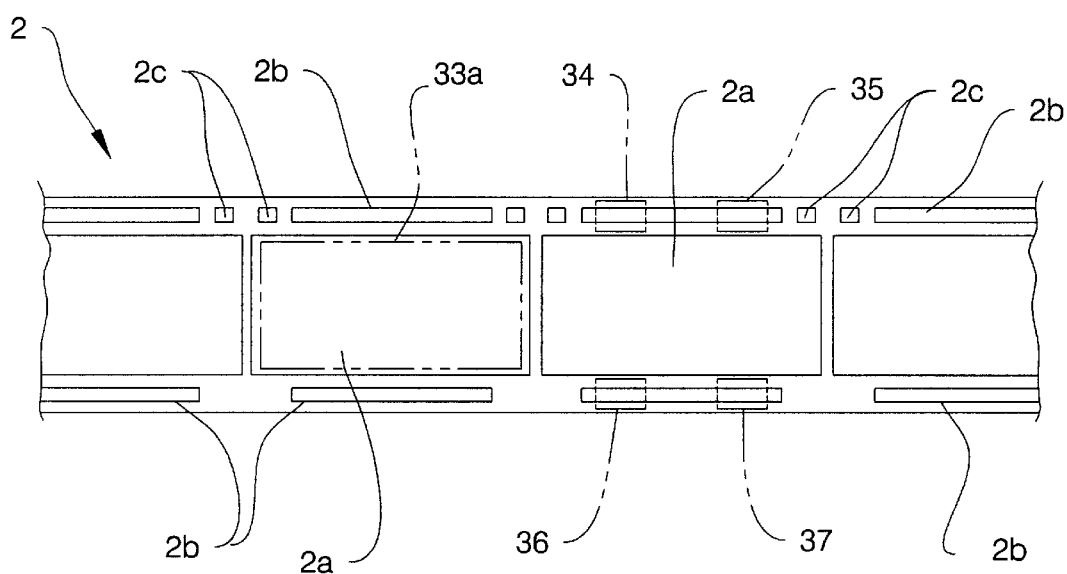
FIG. 4 is a top view showing the relative positions of a photographic film and a magnetic head in accordance with an embodiment of the present invention.

Further, as shown in FIG. 4, disposed along the magnetic track 2b of the film 2 are magnetic heads 34 and 36 for reading data, a magnetic head 35 for writing data and a dummy head 37.

The dummy head 37 removes dust disposed on the magnetic track 2b. Thus, the reading precision of the magnetic head 36 is improved by this arrangement. Further, since bubble springs 38 are disposed on opposite sides of the magnetic heads 34, 35 and 36, a reliable contact between the magnetic heads 34, 35 and 36 and the magnetic track 2b is provided.

The film transfer unit 5 comprises an upper unit 40 and a lower unit 41, each having a frame shape and being pivotally connected to an axis 42. The upper and lower units 40 and 41 are biased toward an opening direction of the units by springs 43.

Figure 5:
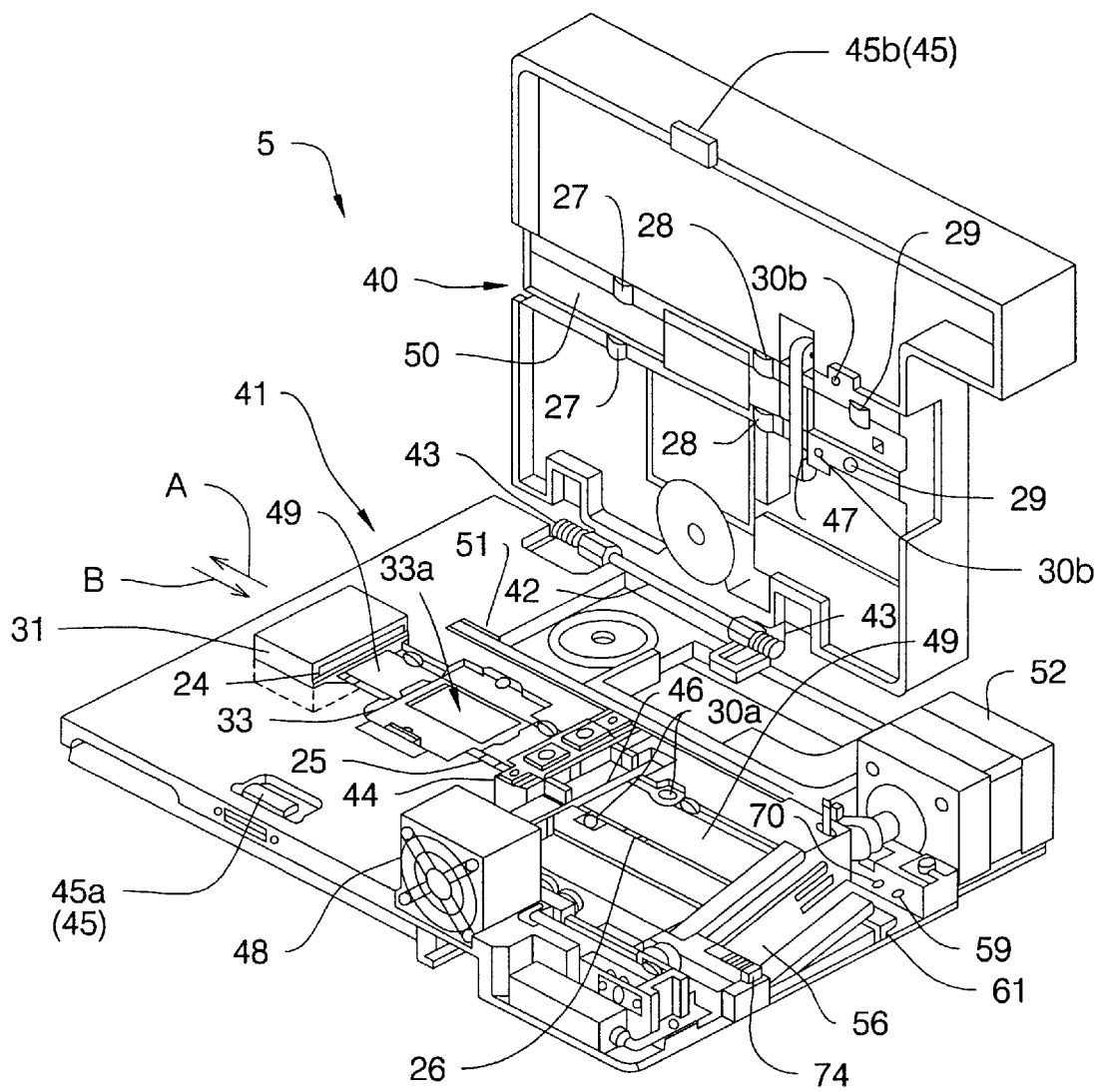
FIG. 5 is a perspective view of a film transfer unit in accordance with an embodiment of the present invention.
Figure 6:
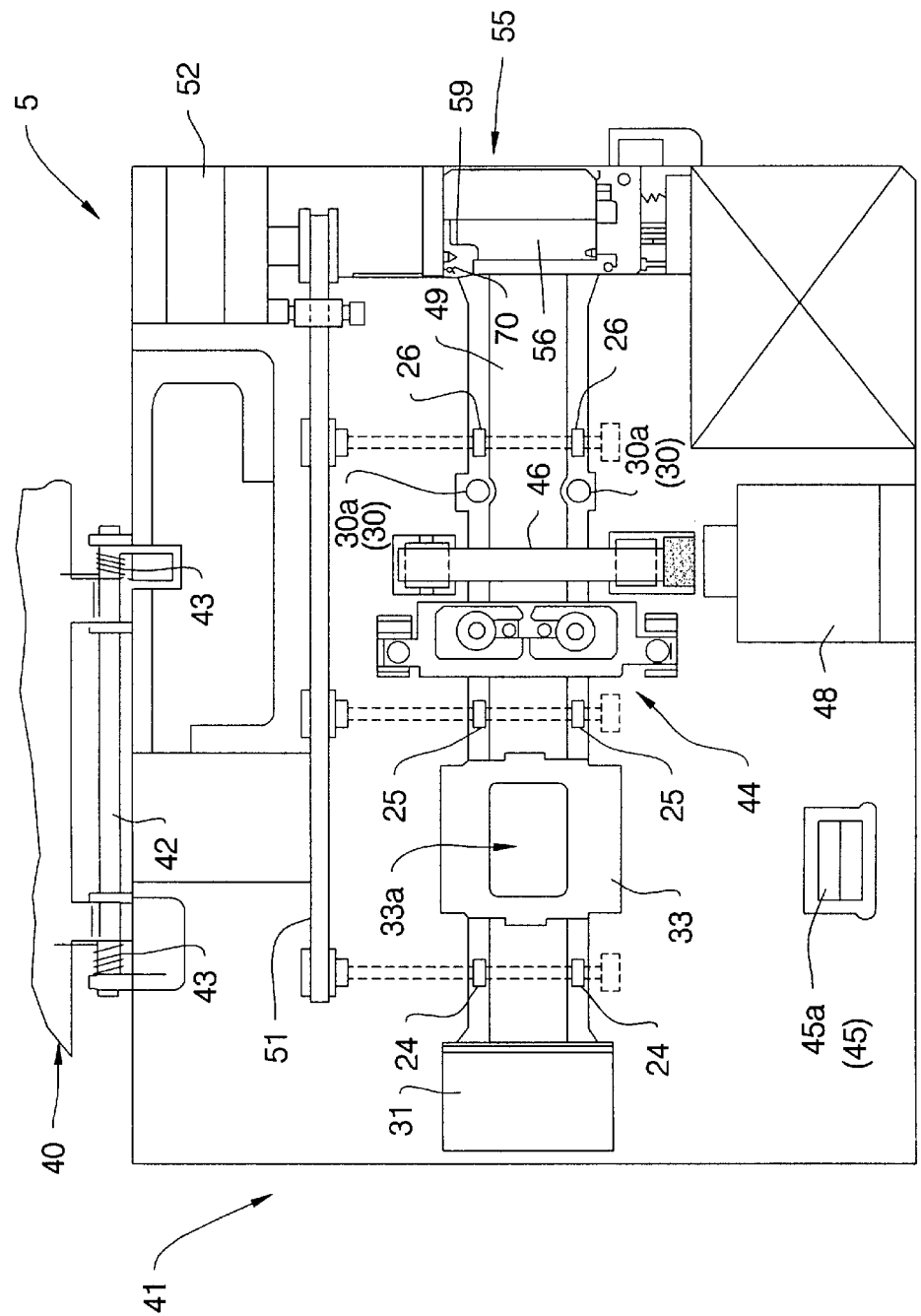
FIG. 6 is a plan view of a lower portion of the film transfer unit in accordance with an embodiment of the present invention.

FIG. 5 shows that the upper and lower units 40 and 41 are opened and FIG. 6 shows a plan view of the lower unit 41.

The driving rollers 24, 25 and 26 are disposed to transfer the film 2. A lower guide 49 has a recess to pass a picture surface of the film 2, and supports and guides both right and left side edge portions of the film 2. A motor 52 drives the driving rollers 24, 25 and 26 by way of a belt 51. Further, the above-mentioned optical sensor 30 and the negative mask 33 are installed in the film transfer unit 5.

A magnetic head device 44 has the above-mentioned magnetic heads 34, 35 and 36, and the dummy head 37. The magnetic head device 44 reads information recorded magnetically on the magnetic track 2b of the film 2 and writes some information magnetically onto the magnetic track 2b. A detailed explanation of the structure of the magnetic head device will be omitted.

A lower cleaning belt 46 and a fan 48 function as a dust collector to remove dust disposed on the surface of the film 2. Further, a driving motor 52 moves the lower cleaning belt 46 by way of a transmission mechanism (not shown).

The detailed structure of the upper unit 40 is shown in FIG. 5. A upper guide 50 is formed with a recess to pass a picture surface of the film 2, and it supports and guides both right and left sides edge portions of the film 2 with the above-mentioned lower guide 49. The pressure rollers 27, 28 and 29 are disposed on opposite sides of the driving rollers 24, 25 and 26 respectively, when the upper and lower units 40 and 41 are disposed in their closed positions, respectively. The light receiving portion 30b is disposed on an opposite side of the light supply portion 30a of the optical sensor 30. Further, the upper cleaning belt 47 is disposed on an opposite side of the lower cleaning belt 46. The upper cleaning belt 47 is driven by a motor (not shown).

The upper unit 40 is engaged with the lower unit 41 by an engaging portion 45. The engaging portion 45 comprises a hanger portion 45a formed in the lower unit 41 and a hook portion 45b formed in the upper unit 40.

Figure 7:
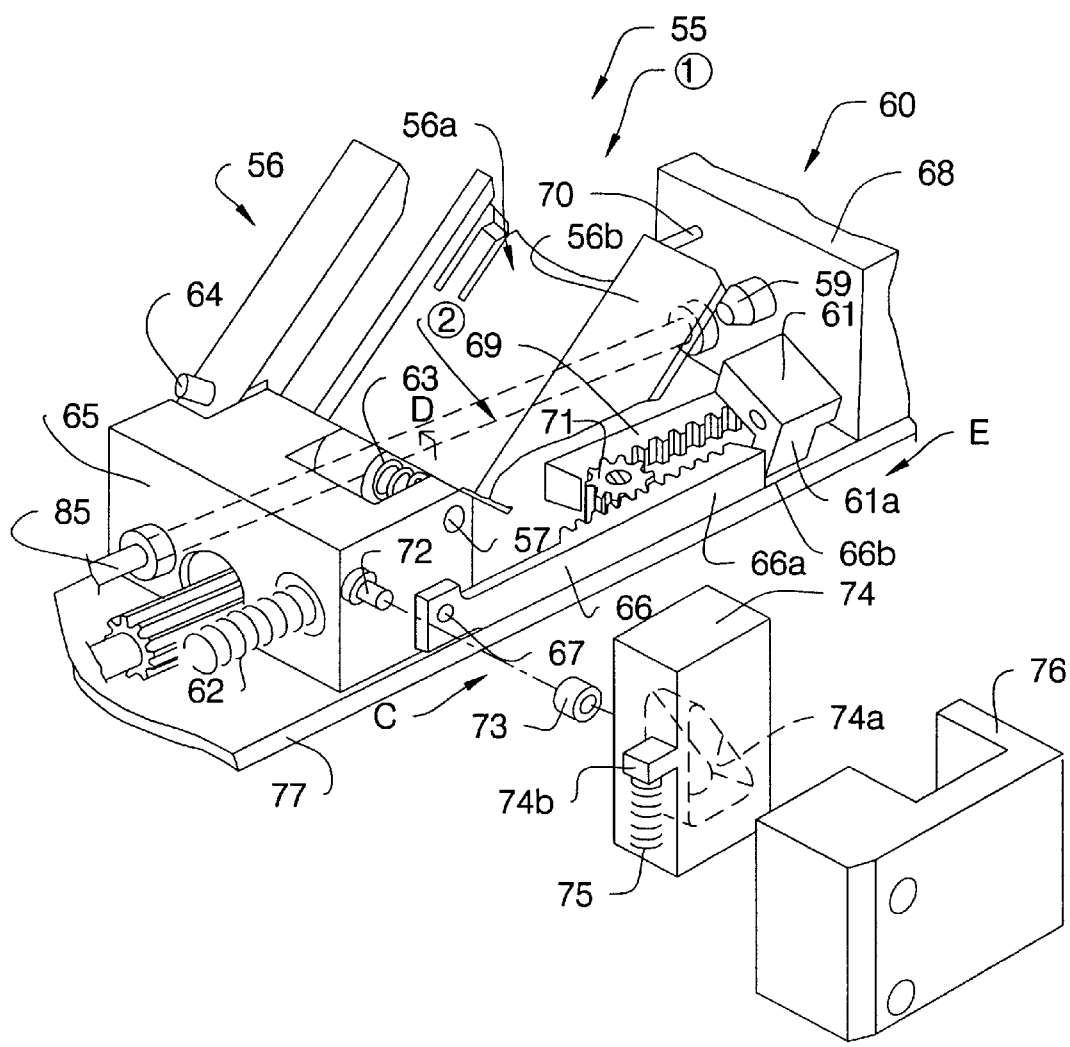
FIG. 7 is a perspective view of a cartridge loading device in accordance with an embodiment of the present invention.

FIG. 7 is a perspective view showing the cartridge loading portion 55. A cartridge loading portion 55 has a cartridge holder 56; a holder supporting member 58 rotationally supporting the cartridge holder 56 around the supporting axis 57; a supporting member 60 for supporting the supporting axis 59; a stopper 61 for preventing a movement of the holder supporting member 58 in a direction of arrow C; a bias spring 62 for biasing the holder supporting member 58 in the direction of arrow C and a holder bias spring 63 for biasing the cartridge holder 56 in a counterclockwise direction around the supporting axis 57 as shown by arrow D in FIG. 7.

A swing angle adjustment boss portion 64 is attached to the cartridge holder 56 and can adjust the position of the cartridge holder 56. The position adjustment of the cartridge holder 56 can be done by adjusting the attachment position of the boss portion 64 and the size of the boss portion 64. The holder supporting member 58 has a block 65 and a stopper plate 66 which are connected to each other by a screw 67. It is preferred that the attached portion of the screw 67 is inserted in an elongated opening and is able to adjust the attachment position of the stopper plate 66. A rack gear 66a is formed on the stopper plate 66. Further, since an edge portion surface 66b of the stopper plate 66 contacts a contact surface 61a of the stopper 61, any further movement of the holder supporting member 58 by a spring 62 in the direction of arrow C is prevented.

Since the cartridge holder 56 has a large opening at its upper portion, it can visually confirm the existence of the cartridge 18 even when the cartridge is loaded in place.

The supporting member 60 for supporting the spool supporting axis 59 has a block 68 and a rack gear 69 which are integrally connected to each other. The block 68 has the spool supporting axis 59 and a light door driving axis 70. Since a pinion gear 71 engages the rack gears 69 and 66a respectively, the supporting member 60 moves in a direction of arrow E (a reverse direction of arrow C corresponding to the movement of the holder supporting member 58 in the direction of arrow C).

A pin 72 is disposed on a side portion of the block 65 and a collar 73 is inserted over the peripheral surface of the pin 72.

A return button 74 is for returning the holder supporting member 58 (which has already moved in the direction of arrow C as shown in FIG. 7) by releasing an obstructed condition caused by the stopper 61, and returning to the original movement obstructed condition. The return button 74 has a substantially triangle-shaped cam portion 74a and a projection portion 74b to effect a button return spring 75. The cam mechanism has the cam portion 74a and the collar 73 inserted into the cam portion 74a. Further, a button cover 76 is attached and fixed to a base portion 77 on the outside of the return button 74.

FIG. 7 shows a condition where the cartridge holder 56 is in a position where a cartridge can be loaded in or taken out. When the cartridge 18 is loaded and the cartridge holder moves in a direction of arrow ②, the film cartridge moves to a film withdraw position where the photographic film may be withdrawn from the cartridge 18.

A condition of the holder supporting member 58 shown in FIG. 7 shows a first position where a withdraw opening of the photographic film cartridge 18 does not coincide with the transfer path of the photographic film due to the stopper 61. When the stopper 61 is released, the withdraw opening of the photographic film cartridge 18 moves toward the transfer path so as to coincide with the transfer path as a second position.

Figure 8:
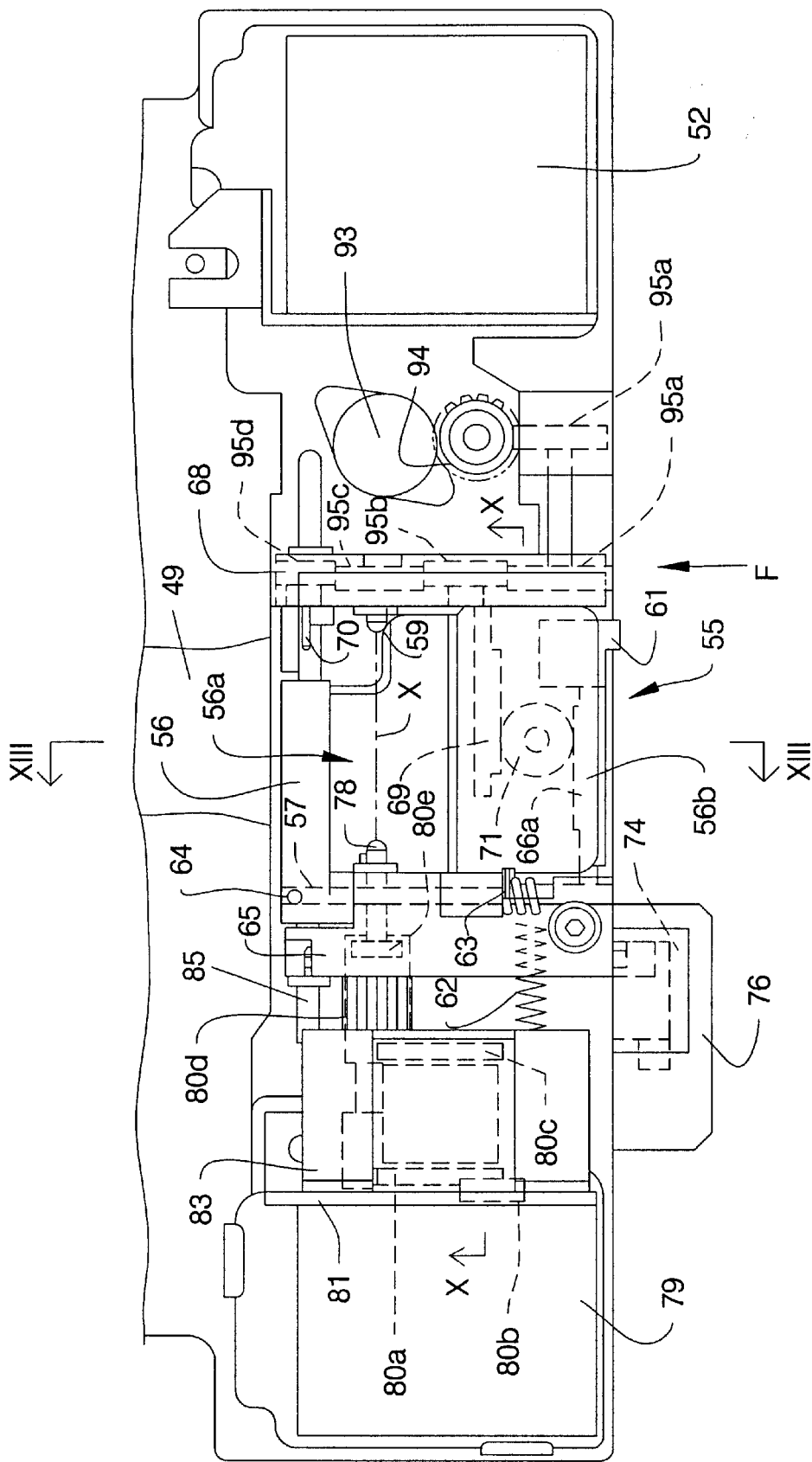
FIG. 8 is a plan view of the cartridge loading device in accordance with an embodiment of the present invention.
Figure 9:
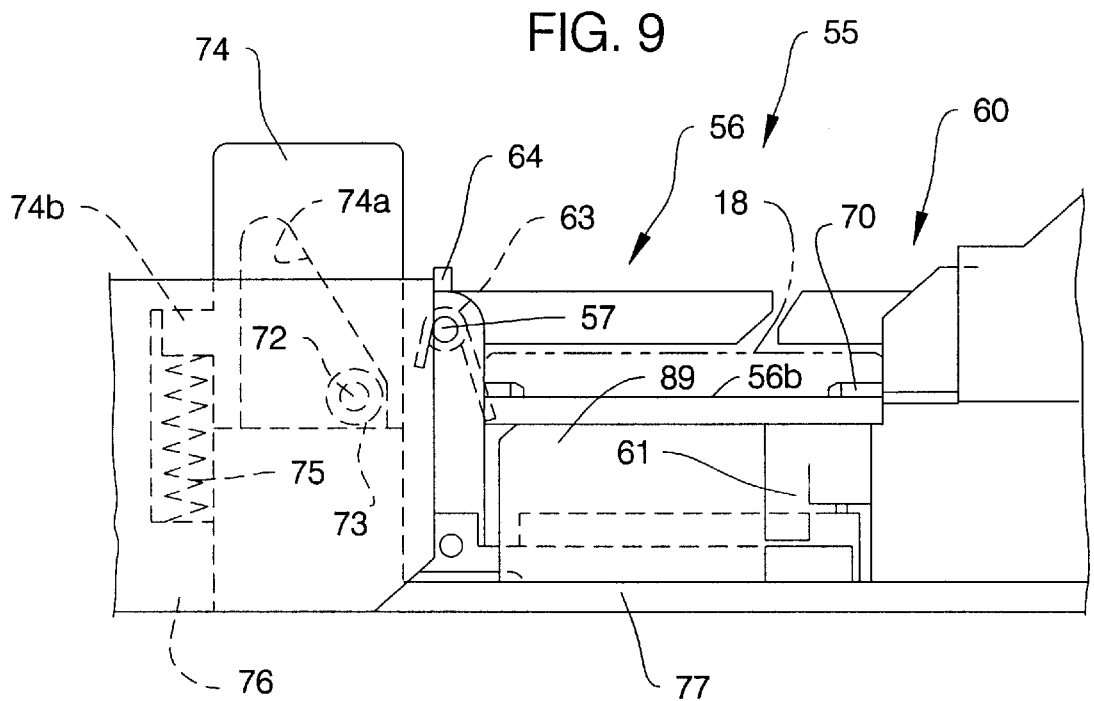
FIG. 9 is a side view of the cartridge loading device as viewed along direction arrow F of FIG. 8.
Figure 10:
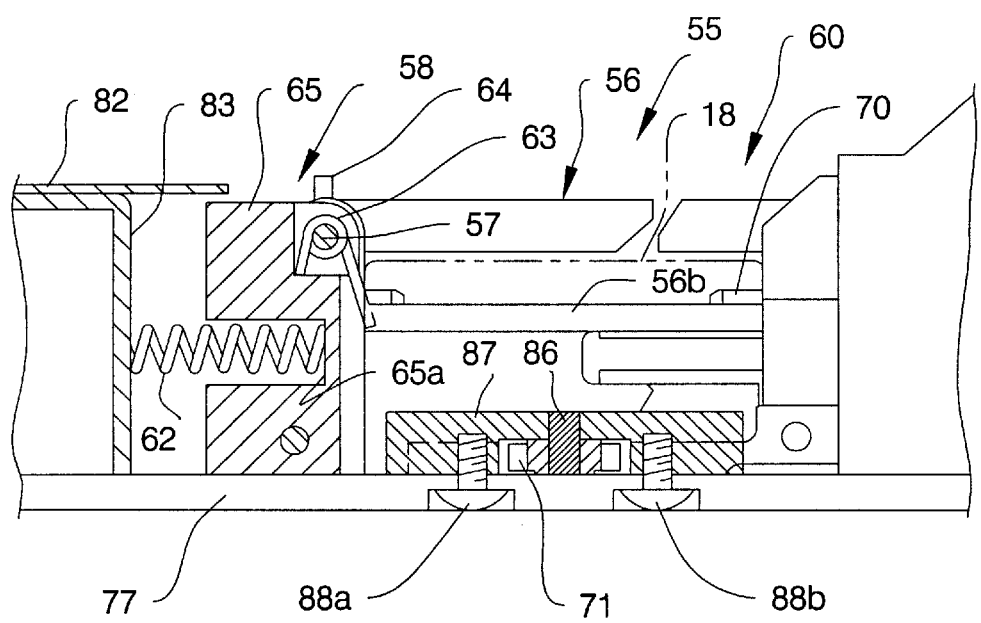
FIG. 10 is a cross sectional view taken along line X—X in FIG. 8.

FIG. 8 is a plan view of the cartridge loading portion 55 and also shows the lower guide 49 for the transfer path as shown in FIGS. 5 and 6. FIG. 9 is a side view of the cartridge loading device as viewed along arrow F of FIG. 8. FIG. 10 is a cross sectional view taken on line X—X in FIG. 8. These figures show that the loading of the cartridge 18 has been completed. In other words, these figures show that the cartridge holder 56 is disposed in the non-loading position and the holder supporting member is disposed at the second position.

The cartridge holder 56 has the holder portion 56a to hold the cartridge 18 and a stopper release portion 56b disposed higher than the stopper 61 to release the stopper 61. The cartridge holder 56 is supported movably around the supporting axis 57 which has the same axis as the Y axis shown in FIG. 13. A spool driving axis 78 is disposed on an opposite side of a spool supporting axis 59 attached to the block 68 and is attached to a block 65. A connecting line X connecting these axes 59 and 78 is a center line of the cartridge 18 which is also the same as the spool supporting axis 59.

Figure 11:
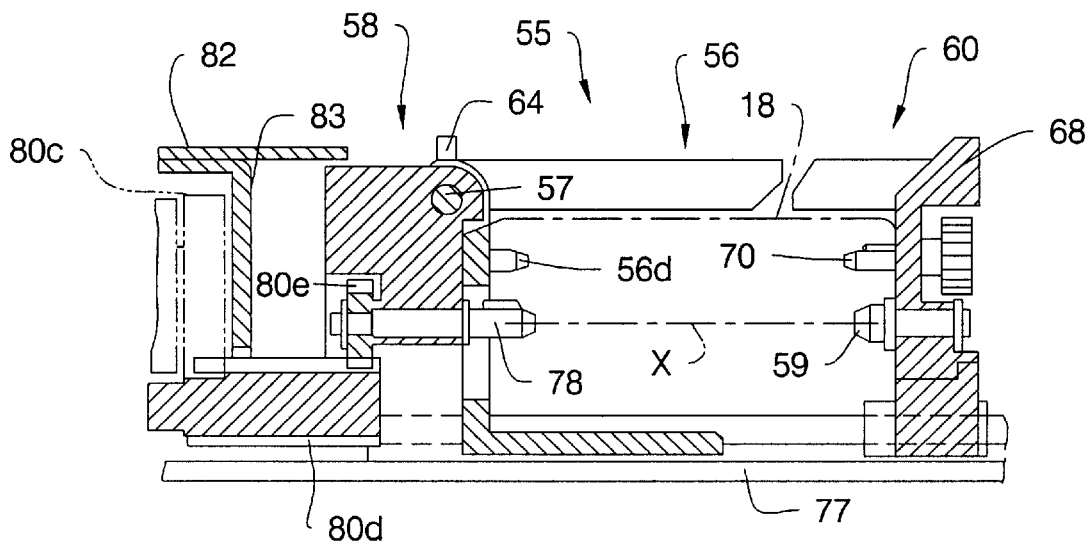
FIG. 11 is a cross sectional view of a cartridge holder in accordance with an embodiment of the present invention.

Further, a supporting mechanism of the spool 20 of the cartridge 18 will be described with reference to FIG. 11. A spool supporting axis 59 only supports the spool of the cartridge 18. On the other hand, the spool driving axis 78 withdraws the photographic film from the cartridge 18 and winds the film based on the direction of driving the spool. The driving motor 79 is fixed to the base portion 77 by way of a motor attachment plate 81 to drive the spool as shown in FIG. 8. The driving power of the motor 79 is transferred to the spool driving axis 78 by way of gears comprising a motor gear 80a attached to the axis of the motor 79 and gears 80b, 80c, 80d and 80e. Further, the gear 80e is integrally connected to the spool driving axis 78. The motor 79 is surrounded by a motor cover 82 as shown in FIGS. 10 and 11.

One end portion of the aforementioned bias spring 62 for the holder supporting member is stored in a store recess 65a formed in block 65 and the other end portion contacts plate 83 which is fixed to the motor attachment plate 81 by a screw as shown in FIG. 10.

Figure 12:
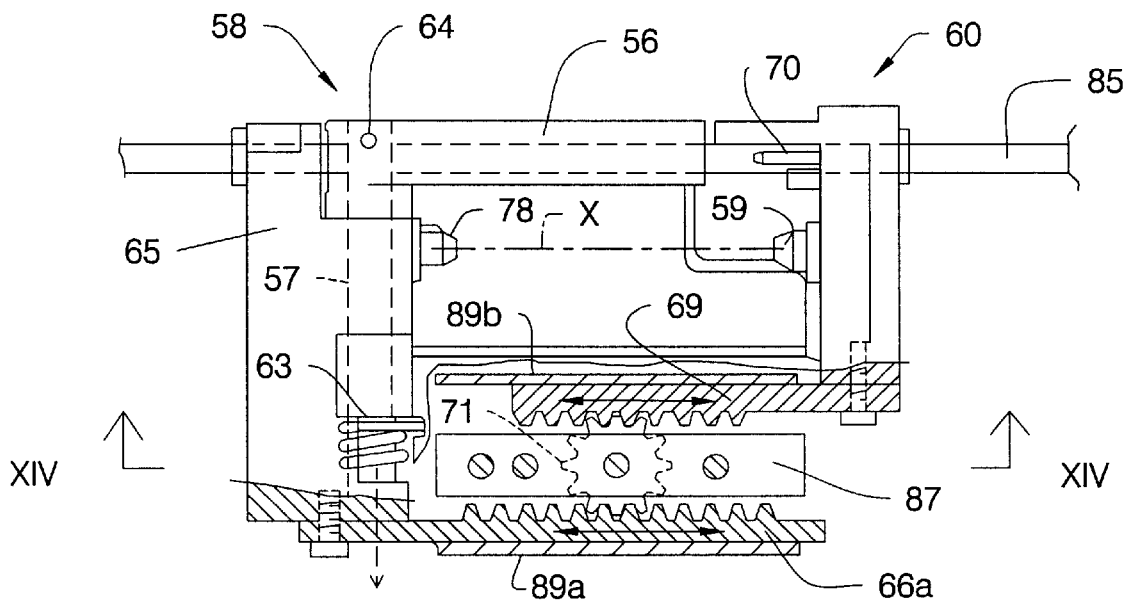
FIG. 12 is a partial cross sectional view showing the details of a rack gear mechanism such as shown in FIG. 8.

As shown in FIG. 12, the holder supporting member 58 and the supporting member 60 are guided by a common guide axis 85 respectively.

The structure of the rack gears 66a and 69 and the pinion gear 71 will now be described with reference to FIGS. 12 through 14. FIG. 14 shows an upper portion of the pinion gear 71 which is not shown in FIG. 10.

FIG. 12 is a partial cross sectional view of the rack gear mechanism. FIG. 13 is a cross sectional view taken along line XIII—XIII in FIG. 8. FIG. 14 is a cross sectional view taken on line XIV—XIV in FIG. 12.

The pinion gear 71 is rotationally supported around a pinion gear supporting axis 86. The supporting axis 86 is supported by a first gear block 87 and is attached to a base plate 77 by two screws 88a and 88b. A second gear block 89 is attached to an upper portion of the first gear block 87 by a screw 90 as shown in FIG. 14 and the second gear block 89 has a first side portion 89a and second side portion 89b. A projection portion 89c is formed at the second side portion 89b as shown in FIG. 13 and the projection portion 89c is engaged in an engaging groove 56c formed in the cartridge holder 56. The engagement between the portion 89c and groove 56c prevents returning the cartridge holder 56 by the holder bias spring 63.

The stopper 61 is rotationally supported at the stopper supporting axis 91 at one end portion of the second gear block 89. The stopper 61 is biased rotationally in a counterclockwise direction by a bias spring 92 having a stopper. When the cartridge holder 56 is disposed in the loading position such as shown in FIG. 7, the stopper 61 is disposed in a predetermined position which is shown as the one dot broken line in FIG. 13. When the cartridge holder 56 is moved to the non-loading position, the stopper 61 is rotated in the clockwise direction by the stopper release portion 56b. Accordingly, the holder supporting member is released from the obstructed movement condition and is then moved in the direction of arrow C as shown in FIG. 7.

Figure 15:
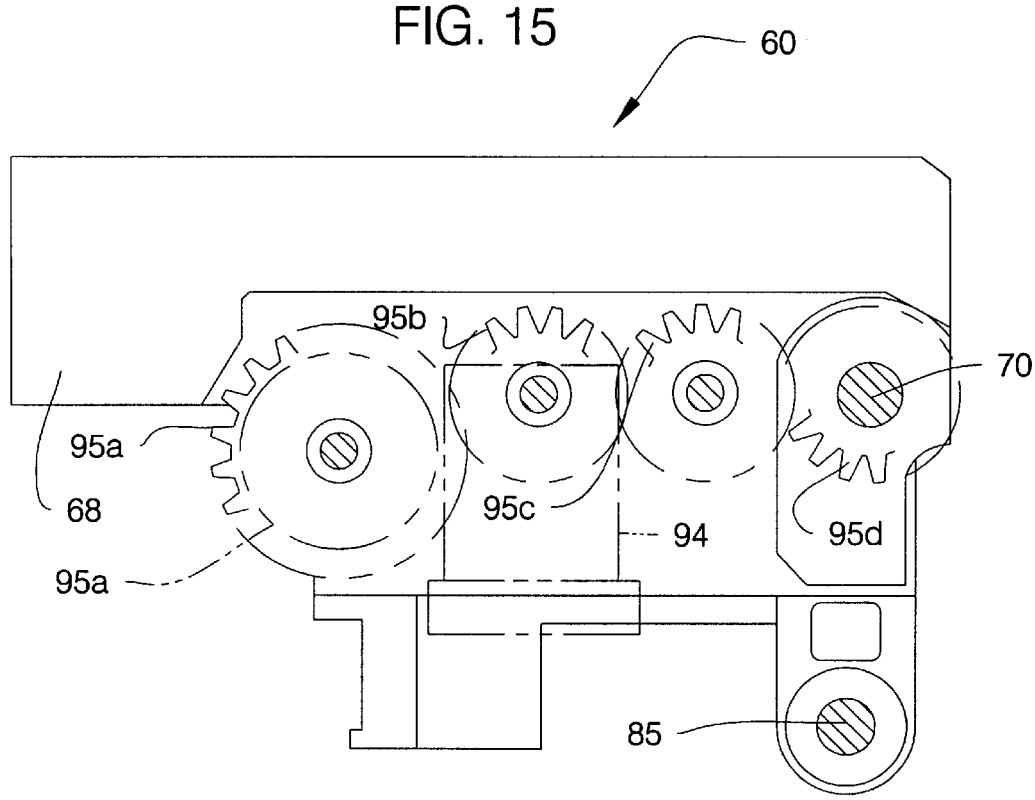
FIG. 15 is a diagrammatic view of a driving mechanism used in opening a light door in accordance with an embodiment of the present invention.

The driving mechanism of the light door 19 of the film cartridge 18 will now be described as shown in FIGS. 7 and 15.

FIG. 15 is a view of the block 68 when viewed from a side opposite to the side having the light door driving axis 70. As shown in FIG. 7, the light door driving axis 70 is disposed on the supporting member 60 and the light door is opened and closed by rotating the light door driving axis 70. Further, a light door supporting axis 56d is disposed on an opposite position from the light door driving axis 70 of the cartridge holder 56 as shown in FIGS. 11 and 13.

The driving mechanism of the light door 19 is driven by a driving motor 93 which is attached to the base plate 77 as shown in FIG. 8. The output of the motor 93 is transferred to the light door driving axis 70 by means of gears 94, 95a, 95b, 95c and 95d. The light door driving axis 70 is coaxial with the gear 95d. When the output of the motor 93 is transferred from the gear 94 to the gear 95a, the rotational direction of the gear is changed.

The movement of the film transfer unit 5 will now be described prior to describing the cartridge loading mechanism.

As shown in FIG. 5, when the film transfer unit 5 is opened, the cartridge 18 is set into the cartridge loading portion 55. In detail, the cartridge 18 is held by the holding portion 56a of the cartridge holder 56. Then, the loading operation is completed to close the cartridge holder 56 against the bias of the holder bias spring 63.

In case the film transfer unit 5 is in a closed condition, the light door 19 is opened by the light door driving axis 101 based on a predetermined start signal. Then, the film 2 is withdrawn from the cartridge 18 by driving the spool 20. The withdrawn film 2 is transferred in the direction of arrow A by the driving motor 52 as shown in FIGS. 5 and 6. Further, the upper and lower cleaning belts 46 and 47 are moved so as to correspond with the withdrawing movement of the film 2 at the same time.

The withdrawn film 2 passes through a portion having the optical sensor 30, and then the recorded optical information of the film 2 is read by the optical sensor 30. Further, the film 2 passes through a space between the upper and lower cleaning belts 46 and 47 to clean any dust off the film 2. Especially, the dust of the picture area 2a of the film 2 is removed by this action. The removed dust is transferred outside of the film transfer unit 5 by the fan 48.

After passing through the upper and lower cleaning belts 46 and 47, the film 2 is transferred to the magnetic head device 44 and then the magnetic data recorded on the film 2 is read by the magnetic heads 34 and 36. On the other hand, when it is necessary to write any magnetic data on the film 2, such a data is written on the film 2 by the magnetic head 35. Since the dummy head 36 is disposed upstream of the magnetic head 36, the dummy head 37 removes dust, especially any coagulated developing solution from the surface of the magnetic track 2b of the film 2. As described above, since any dust including the coagulated developing solution is removed from the film 2 prior to reading and writing of the information, the precision of reading and writing of the information is improved.

After the film 2 is transferred in the direction of arrow A as shown in FIG. 5 and all information recorded on the all pieces 2a of the film 2 is read, the film 2 is transferred to rewind in the direction of arrow B. Then, the film 2 is transferred in the direction of arrow A again and printing and exposure are carried out on each piece 2a of the film 2 at the exposure portion 100. When the printing and exposure of the film 2 is carried out, each piece 2a of the film 2 is positioned in the opening 31a and then the exposure is carried out. In the other case, it is also preferred that the printing and exposure is carried out with the film 2 winding in the direction of arrow B. When the exposure condition is decided, the magnetic information data read from the film 2 prior to the exposure step is used. After the necessary printing and exposure steps are carried out, the film is rewound into the cartridge 18.

The operation of the cartridge loading portion 55 will now be described related to FIGS. 16 through 18.

Figure 16:
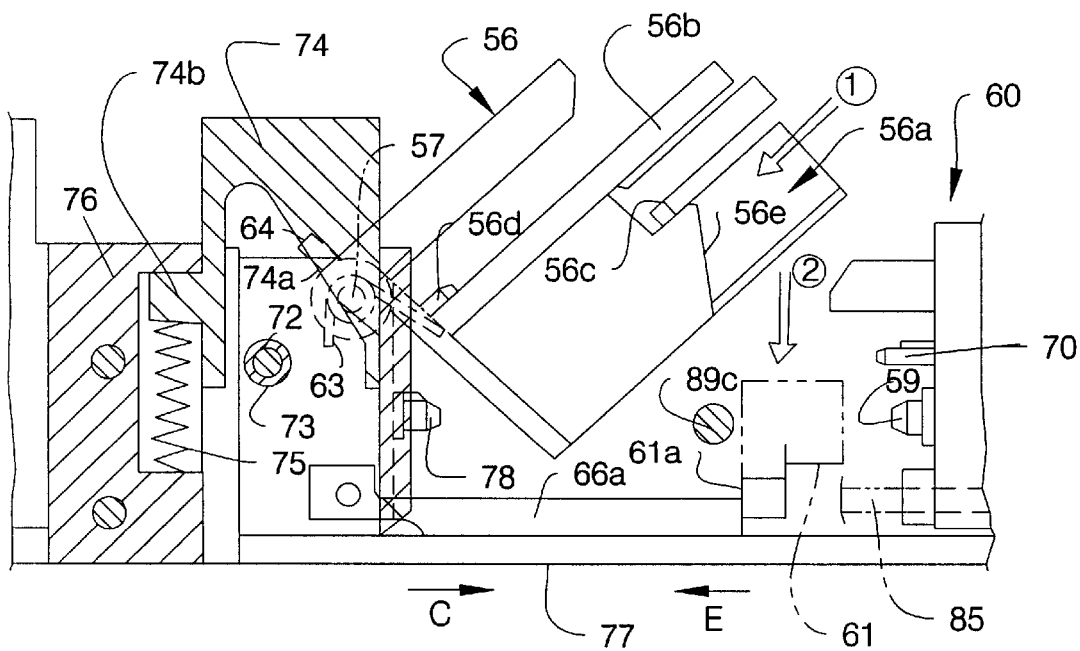
FIG. 16 is a side view of a cartridge loading portion for explaining the operation of loading a cartridge in accordance with an embodiment of the present invention.

FIG. 16 is a view showing that the cartridge holder 56 is disposed in the loading position. The cartridge holder 56 is biased in the counterclockwise direction by the holder bias spring 63. However, the swing angle adjustment boss portion 64 contacts to the block 65 to prevent further rotation of the cartridge holder 56.

The cartridge 18 is inserted into the holding portion 56a from the direction of arrow ① which is shown in FIGS. 7 and 16. After inserting the cartridge 18, the light door 19 is engaged by the light door supporting axis 56d of the cartridge holder 56.

The cartridge holder 56 is then rotated in the direction of the arrow ② which is shown in FIGS. 7, 16 and 17. FIG. 17 is a view showing a condition where the cartridge holder 56 just finishes the rotational operation.

During rotation of the cartridge holder 56, the holder supporting member 58 is moved slightly in a direction of arrow E from an effect of the cam portion 56e formed integrally with the cartridge holder 56 and an cam portion (not shown) formed integrally with the second gear block 89. Namely, the contact surface 61a of the stopper 61 contacts the stopper plate 66 of the holder supporting member 58 by the power of the bias spring 62 of the holder supporting member 58 as shown in FIG. 7. If the stopper 61 is released under this condition, a relatively large operational power is required to release the stopper 61 and this is larger than the friction occurring on the contact surface 61a. Therefore, in this embodiment, since the holder supporting member 58 is moved slightly in the direction of arrow E, it is easy to release the contact surface 61a of the stopper 61 away from the stopper plate 66 of the holder supporting member 58. In other words, since the holder supporting member 58 is moved slightly in the direction of arrow E, the amount of friction occurring on the surface 61a is reduced.

Figure 13:
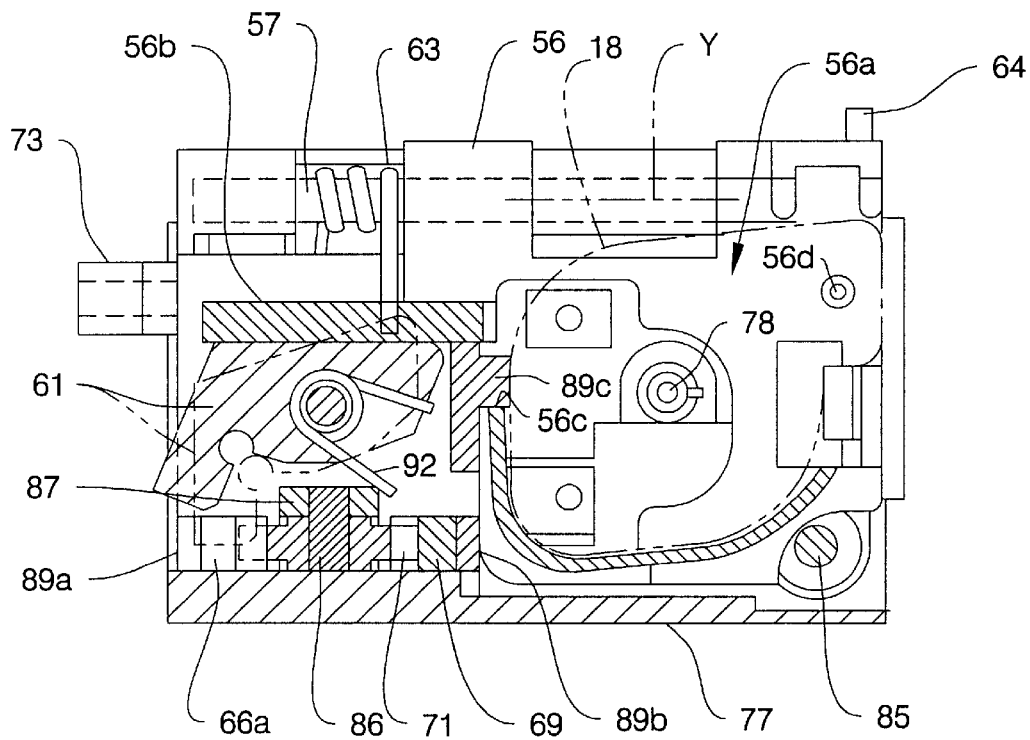
FIG. 13 is a cross sectional view taken along line XIII—XIII in FIG. 8.
Figure 14:
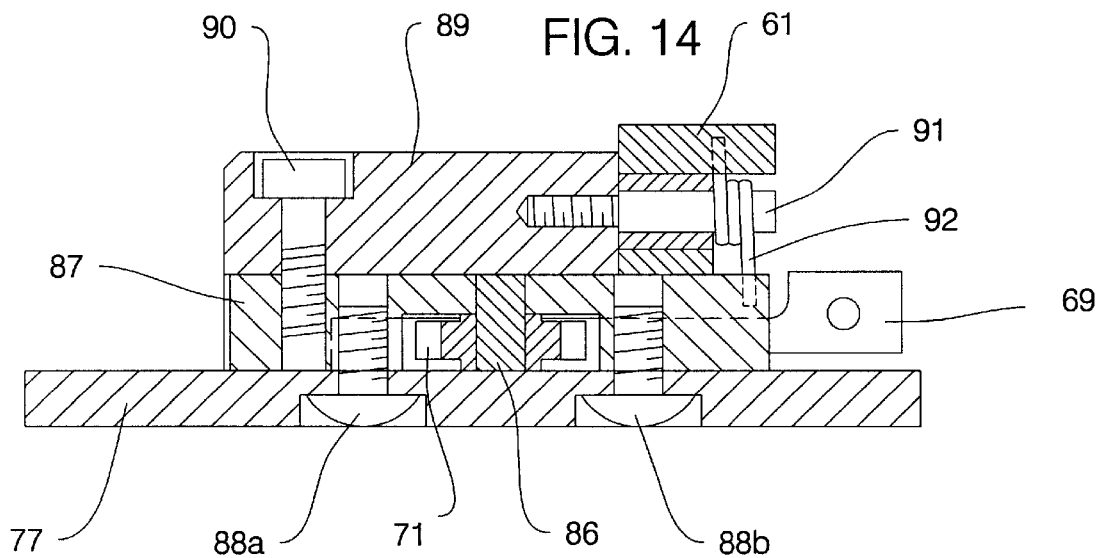
FIG. 14 is a cross sectional view taken along line XIV—XIV in FIG. 12.

The release of the stopper 61 is carried out by pushing on the upper surface of the stopper 61 by the stopper releasing portion 56b of the cartridge holder 56 as shown in FIG. 13. The stopper 61 is rotated from the position indicated by the one dot broken line in a clockwise direction as shown in FIG. 13.

FIG. 17 is a view showing the stopper 61 after is has just been released. At this time, the film withdraw opening 18a of the cartridge 18 does not coincide with the transfer path of the film 2 since it is in the first position. Further, the above-mentioned condition means that the projection 89c of the second gear block 89 does not engage the engaging groove 56c while the spool 20 of the cartridge 18 engages the spool driving axis 78.

Figure 20A:
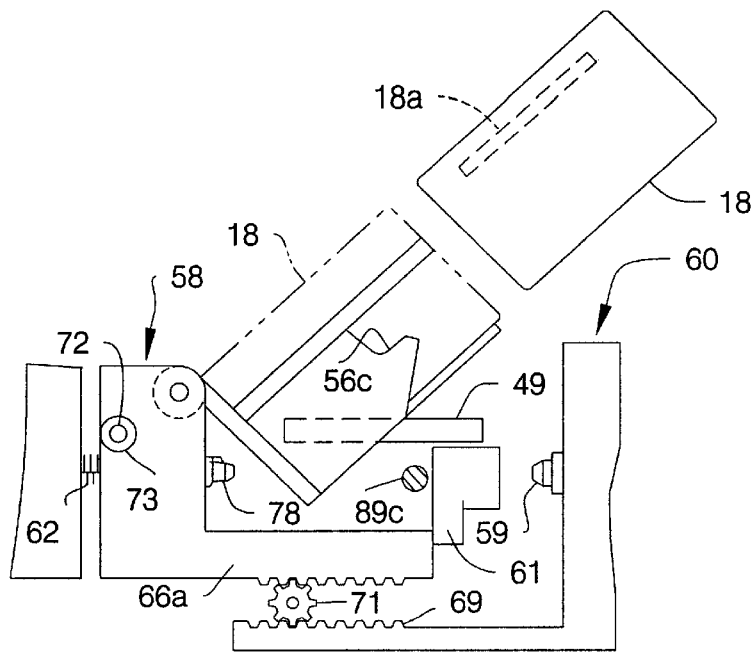
FIGS. 20A, 20B, 20C are side views of the cartridge loading portion and the gear movement as a cartridge is loaded in position in accordance with an embodiment of the present invention.
Figure 20B:
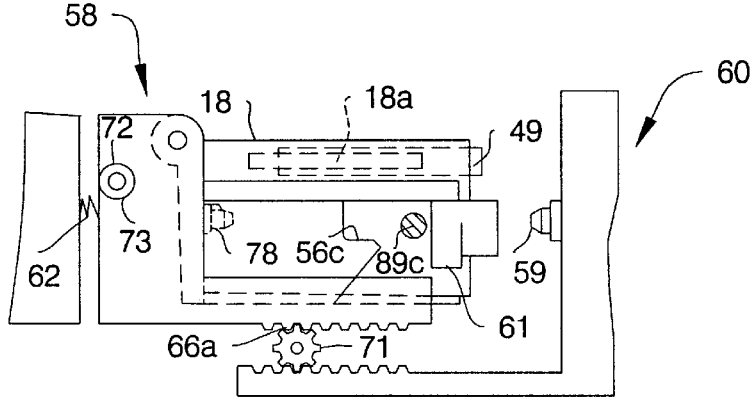

The holder supporting member 58 and the cartridge holder 56 are moved from the first position shown in FIG. 17 in the direction of arrow C by the effect of the holder bias spring 63. As shown in FIG. 17, the supporting member 60 having the spool supporting axis 59 is moved in the direction of arrow E by the rack gear 66a, the pinion gear 71 and the rack gear 69 corresponding to the movement of the holder supporting member 58. FIG. 20 is a plan diagram of the gears 66a, 71 and 69 for explaining the movement of the gears.

Figure 20C:
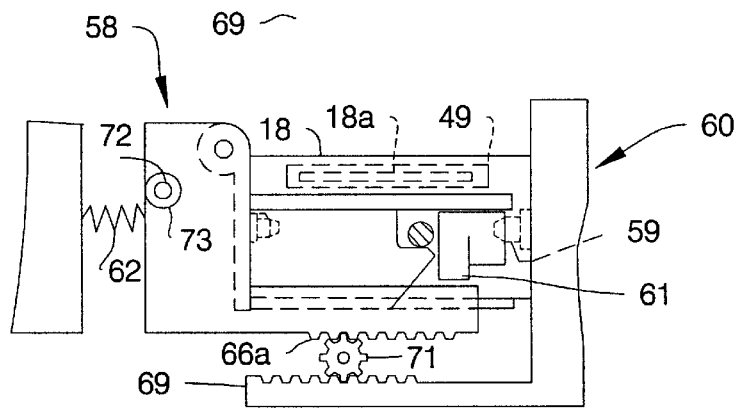

According to the above-mentioned movement of the gears, the spool supporting axis 59 and the light door driving axis 70 are engaged with the cartridge 18 respectively. Further, since the engaging groove 56c engages with the projection 89c, it prevents the cartridge holder 56 from returning to the loading position as shown in FIG. 18. Furthermore, as shown in FIG. 20C, since the film withdraw opening 18a now coincides with the transfer path, it is possible to withdraw the film from the cartridge 18. Then, the upper unit 40 of the film transfer unit 5, shown in FIG. 5, is closed on the lower unit 41.

The film withdrawing operation will now be described. First, the light door driving motor 93 is driven to drive the light door driving axis 70 for opening the light door. At this time, the film is now able to be withdrawn. Then, the spool driving motor 79 is driven to drive the spool driving axis 78. The film 2 is continuously withdrawn by the above movement of the spool driving axis 78.

After the above-mentioned predetermined treatment is carried out, the film 2 is rewound into the cartridge 18 by rotation of the spool driving motor 79 in the reverse direction. The completed rewinding operation of the film 2 into the cartridge 18 is detected by the optical sensor 30 of the film transfer unit 5. In other words, the completely rewound film is determined after a predetermined time has passed after the film is no longer detected by the optical sensor 30.

The process for removing the cartridge will now be described.

Figure 19:
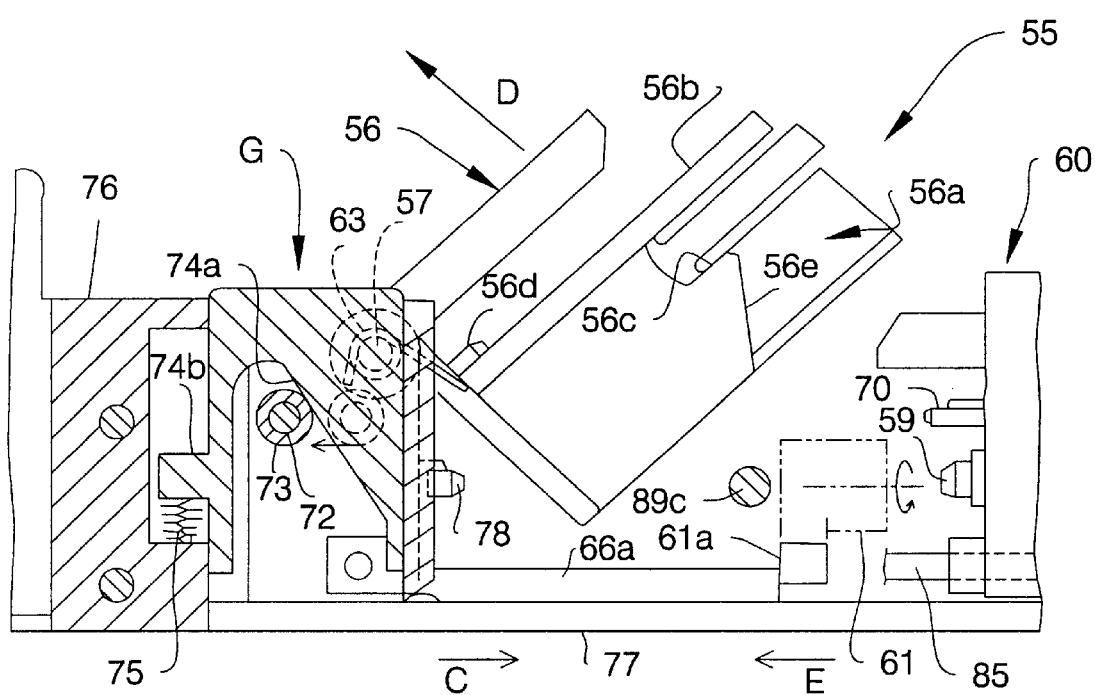
FIG. 19 is a further side view of the cartridge loading portion for explaining the operation of loading a cartridge in accordance with an embodiment of the present invention.

As shown in FIG. 5, the upper and lower units 40 and 41 of the film transfer unit 5 are opened. Then, the return button 74 is pushed down in the direction of arrow G as shown in FIG. 19. The pin 72 is moved by the cam portion 74a disposed in the return button 74. Accordingly, the holder supporting member 58 and the cartridge holder 56 are forcibly moved in the direction of arrow E. Since the pin 72 is inserted into the collar 73, the above-mentioned movement is carried out smoothly. Thus, the engaged condition between the engaging groove 56c and the projection 89c is released and the cartridge holder 56 is moved by the holder bias spring 63 in a direction D which is a counterclockwise direction, as shown in FIG. 19. On the other hand, the stopper 61 is returned to the position where it is able to obstruct movement of the holder supporting member 58 caused by the stopper bias spring 92. The return button 74 is returned to the original position by the button return spring 75 after the force pushing down on the return button 74 is released.

The bias spring 62 for the holder supporting member 58 has the function of a supporting member bias means which biases the holder supporting member 58 in a direction from the first position toward the second position. The holder bias spring 63 functions as a holder bias means which biases the cartridge holder 56 from the non-loading position to the loading position.

The projection 89c of the second gear block 89 functions as an obstruction member to obstruct movement of the cartridge holder 56 toward the loading position, when the holder supporting member 58 is positioned in the second position.

The swing angle adjustment boss 64 functions as a rotation restriction member that restricts the rotational position of the cartridge holder 56 in the loading position.

The return button 74 functions as a return member that makes the holder supporting member 58 return from the second position to the first position.

Further, other preferred embodiments of the present invention will now be described. In the above-mentioned embodiment, both the holder supporting member 58 and the supporting member 60 having the spool supporting axis 59 are moved.

However, it is also preferred that the supporting member 60 may be fixed and only the holder supporting member 58 is moved. In this case, the movement of the holder supporting member 58 from the first to the second positions becomes larger than the amount of movement in the above-mentioned first embodiment.

Also in the first embodiment, the cartridge holder 56 is rotationally supported to the holder supporting member 58 to provide an improved operational ability and simple structure. However, the cartridge holder 56 can also be slidably supported to the supporting member 58.

The above-mentioned cartridge of the present invention means a container containing film in general without any limitation that the cartridge can only be used in an advanced photographic system. For example, the cartridge of the present invention can be adapted to a patrone (film cartridge) of a photographic film of a 135 type. In this case, the cartridge has a structure to position the rotational direction of the cartridge at the film withdraw opening portion.

Although the present invention has been fully described by way of example with reference to the accompanying drawings, it is to be understood that various changes and modifications will be apparent to those skilled in the art. Therefore, unless such changes depart from the scope of the invention as defined by this specification and claims, they should be construed as being included herein.

What is claimed is:

1. A cartridge loading device comprising:

a cartridge holder having a holding portion for holding a cartridge having a photographic film therein;

a holder supporting member for supporting said cartridge holder, said cartridge holder being movable between a loading position where the cartridge can be loaded onto said holding portion and a non-loading position where the cartridge is not able to be loaded onto said holding portion;

said holder supporting member being movable between two positions when said holder supporting member supports said cartridge holder in said non-loading position; a first position where a photographic film withdraw opening portion of the cartridge and a transfer path do not coincide and a second position where the photographic film withdraw opening portion and a transfer path do coincide; and said holder supporting member being capable of moving from the first position to the second position based on movement of said cartridge holder from said loading position to said non-loading position.

2. A cartridge loading device as defined in claim 1, further comprising:

a supporting bias means for biasing said holder supporting member from the first position to the second position;

a stopper for obstructing movement of said holder supporting member from the first position to the second position; and said stopper being released upon movement of said cartridge holder from said loading position to said non-loading position.

3. A cartridge loading device as defined in claim 2, wherein said holder supporting member is moved from the second position toward the first position prior to release of said stopper.

4. A cartridge loading device as defined in claim 3, further comprising a cam mechanism disposed on said cartridge holder and said holder supporting member whereby said cam mechanism causes movement of said stopper prior to release of said stopper.

5. A cartridge loading device as defined in claim 2, wherein said stopper is released directly by contact with said cartridge holder.

6. A cartridge loading device as defined in claim 1, further comprising:

a holder bias means for biasing said cartridge holder from said non-loading position to said loading position; and an obstruction member for obstructing movement of said cartridge holder toward said loading position when said holder supporting member is disposed in said second position.

7. A cartridge loading device as defined in claim 6, wherein said cartridge holder is rotationally supported around a predetermined axis of said holder supporting member; and further comprising a rotation restriction member for restricting a rotational position of said cartridge holder in said loading position.

8. A cartridge loading device as defined in claim 7, wherein said rotation restriction member is adjustable so as to adjust the rotational position of said cartridge holder.

9. A cartridge loading device as defined in claim 1, further comprising:

a spool driving axis for supporting one end portion of a spool formed in the cartridge;

a supporting member having a spool supporting axis for attaching to another end of the spool; and said supporting member being moved toward said spool driving axis upon movement of said holder supporting member from the first position to the second position.

10. A cartridge loading device as defined in claim 9, further comprising:

a first rack gear formed integrally with said holder supporting member;

a second rack gear formed integrally with said supporting member; and a pinion gear engaging with said first and second rack gears.

11. A cartridge loading device as defined in claim 1, further comprising:

a return member for returning said holder supporting member from the second position to the first position.

12. A cartridge loading device as defined in claim 11, wherein the return of said return member is carried out a cam mechanism formed by a portion of said holder supporting member and a portion of said return member.

13. A cartridge loading device as defined in claim 1, wherein said cartridge holder has an opening portion shaped so as to allow confirmation of a loaded cartridge in said cartridge holder from outside of said cartridge holder.

14. A cartridge loading device as defined in claim 1, further comprising:

a stopper means for obstructing movement of said holder supporting member from the first position to the second position; and said stopper means being released upon movement of said cartridge holder from said loading position to said non-loading position.

15. A cartridge loading device as defined in claim 1, wherein said cartridge holder is movable in a first direction;

said holder supporting member being movable in a second direction; and said first and second direction being different from each other.

16. A cartridge loading device as defined in claim 15, wherein said cartridge holder being rotationally moved and said holder supporting member being linearly moved.

* * * * *